US012594565B2

(12) United States Patent
Vanmuyen et al.

(10) Patent No.: US 12,594,565 B2
(45) Date of Patent: Apr. 7, 2026

(54) SPRAY GUN WITH ADJUSTABLE ATOMIZER AND REMOVABLE NOZZLE BODY

(71) Applicant: NORAM Engineering and Constructors Ltd., Vancouver (CA)

(72) Inventors: Arie Vanmuyen, Vancouver (CA); Neal Londry, Vancouver (CA); Robert Crane, Vancouver (CA)

(73) Assignee: NORAM ENGINEERING AND CONSTRUCTORS LTD., Vancouver (CA)

( * ) Notice: Subject to any disclaimer, the term of this patent is extended or adjusted under 35 U.S.C. 154(b) by 261 days.

(21) Appl. No.: 18/203,544

(22) Filed: May 30, 2023

(65) Prior Publication Data

US 2024/0399398 A1 Dec. 5, 2024

(51) Int. Cl.
*B05B 7/16* (2006.01)
*B05B 7/24* (2006.01)

(52) U.S. Cl.
CPC .............. *B05B 7/16* (2013.01); *B05B 7/2489* (2013.01)

(58) Field of Classification Search
CPC ................................ B05B 7/16; B05B 7/2489
See application file for complete search history.

(56) References Cited

U.S. PATENT DOCUMENTS 4,154,399 A 5/1979 Riano
4,592,506 A 6/1986 Capes et al.
4,639,209 A 1/1987 Grethe
4,728,036 A 3/1988 Bennett et al.
5,467,925 A 11/1995 Riano
5,732,885 A 3/1998 Huffman
5,807,530 A 9/1998 Anderson
6,161,778 A 12/2000 Haruch
7,108,203 B2 9/2006 Huffman et al.
7,674,449 B2 3/2010 Randolph, III et al.
10,406,543 B2 9/2019 Tabata et al.
2006/0108443 A1* 5/2006 Huffman .................... F23J 7/00 239/132.3

FOREIGN PATENT DOCUMENTS

JP 6781994 B2 11/2020
KR 101363021 B1 2/2014
WO 2015035709 A1 3/2015
WO 2017186970 A1 11/2017

* cited by examiner

*Primary Examiner* — Christopher S Kim
(74) *Attorney, Agent, or Firm* — David J. McGruder; Oyen Wiggs Green & Mutala LLP

(57) ABSTRACT

A spray gun assembly for atomizing a liquid by directing flows of the liquid and a pressurized atomizing gas into an internal mixing chamber. The atomizing fluid is driven through narrow passages in a nozzle body, increasing the fluid's velocity before entering a mixing chamber in the nozzle body, where it breaks up the liquid into fine droplets before the mixture is discharged from a nozzle tip as a fine mist spray. Temperature control is done by feeding a heat transfer fluid such as steam into a flow passage between the passages for the liquid and atomizing fluid, running along the length of the assembly lance. The device is used for atomizing a liquid into finely dispersed droplets, for example as a sulfur gun for the generation of sulfur dioxide in a sulfur combustion furnace.

26 Claims, 8 Drawing Sheets

SPRAY GUN WITH ADJUSTABLE ATOMIZER AND REMOVABLE NOZZLE BODY

FIELD OF THE INVENTION

The invention pertains to spraying apparatuses and methods and, in particular, to spray guns of the type in which a liquid is atomized into finely dispersed droplets via mixing with a pressurized atomization fluid such as air.

BACKGROUND OF THE INVENTION

There are several industrial processes that employ spray guns to discharge a process liquid at high flow rates as a spray of very fine droplets. Creating small size liquid droplets is important for the processes as it increases contact area, mass transfer rate, reaction rate, combustion efficiency, and/or improves other process parameters that benefit from fine liquid dispersion. Efficient atomization of the liquid with generation of small droplet sizes is thus a required feature for many spray guns.

A typical prior art pressure-atomized spray gun utilized in process industries is depicted in FIG. 7. The device directs a pressurized liquid from its inlet F to the spray nozzle outlet G where the pressure drop between the liquid and the spraying environment causes the liquid to undergo primary atomization upon discharge. The inlet H directs a flow of a heat transfer fluid (typically steam) through the internals of the spray gun for heat transfer purposes, and the outlet I allows the resulting condensate to exit the gun. Secondary break-up of the drops occurs as the drops exit the gun due to the high relative velocity between the drops and carrier gas. This type of spray gun has limited functionality, has limited turndown capacity and does not allow for adjustment of atomization properties.

The ability to control the temperature of the fluids flowing through the spray gun, as well as the temperature of the metal that forms the spray gun itself is a beneficial feature, and often a requirement, in some process applications. Temperature control of the fluids allows for control over their temperature-dependent physical properties that affect the flow and atomization of the fluids, such as viscosity and density. Additionally, for spray guns used in combustion operations or in operations in which the sprayed liquid is at a high temperature, the spray gun can become overheated. An ability to remove some heat via a heat transfer is beneficial in order to avoid deformation of material that forms the spray gun, and avoid undesired physical or chemical changes to the fluid inside the spray gun.

As spray guns are often mounted to vessels in industrial processes, with access to the nozzle restricted since it protrudes into the vessel, servicing the spray gun or performing maintenance can be difficult or time consuming.

Many industrial processes may change their production capacity or process conditions over time, or simply change flowrates through the process depending on external factors such as upstream effects, market demand for the product, etc. Thus, an ability to adjust and customize the geometry and performance of the spray nozzle body and tip to achieve optimal liquid atomization at a wide range of flowrates would be advantageous for a spray gun. Additionally, as the supply of auxiliary or utility streams in industrial processes (e.g., instrument air) is often fixed at certain conditions (e.g., pressure), it would be useful to be able to adjust the flow properties of the atomization fluid entering an internal mixing chamber of the spray gun by adjusting the geometry within the spray gun or nozzle body itself. This could help to achieve optimal liquid atomization regardless of the supply conditions of the fluids.

There remains a need for effective apparatus and methods for spraying atomized liquids which ameliorate at least some of the disadvantages of existing systems.

SUMMARY OF THE INVENTION

The invention is directed to spraying devices and methods that involve spraying a liquid as very fine droplets. It is an object of the present invention to provide means to accomplish this operation along with additional functionalities that improve the spray gun's performance, allow for adjustability, improve reliability, and simplify its maintenance.

According to one embodiment of the invention, the spray gun assembly atomizes a liquid by directing flows of liquid and a pressurized atomizing gas into an internal mixing chamber. The atomizing fluid is driven through narrow passages that increase the fluid's velocity before entering the mixing chamber, where it breaks up the liquid into fine droplets before the mixture is discharged from a nozzle tip as a fine mist spray.

The invention accomplishes temperature control of the fluids and the material of construction of the device by feeding a heat transfer fluid (e.g., steam) into a flow passage defined between the passages for the liquid and atomizing fluid, running along the length of the lance.

The spray gun assembly includes a port at the upstream end of the spray gun lance that allows inspection of the main liquid pipe.

The spray gun assembly can be customized to suit a particular spraying operation by reason of its removable nozzle tip and nozzle body as well as its adjustable flow passages which direct the atomizing fluid into the internal mixing chamber. A metallic O-ring seal allows the nozzle body to slide farther into or out of the lance on its threaded connection, exposing more or less flow area, respectively, for the atomization fluid.

Further aspects and example embodiments are illustrated in the accompanying drawings and/or described in the following description.

DETAILED DESCRIPTION

Figure 1:
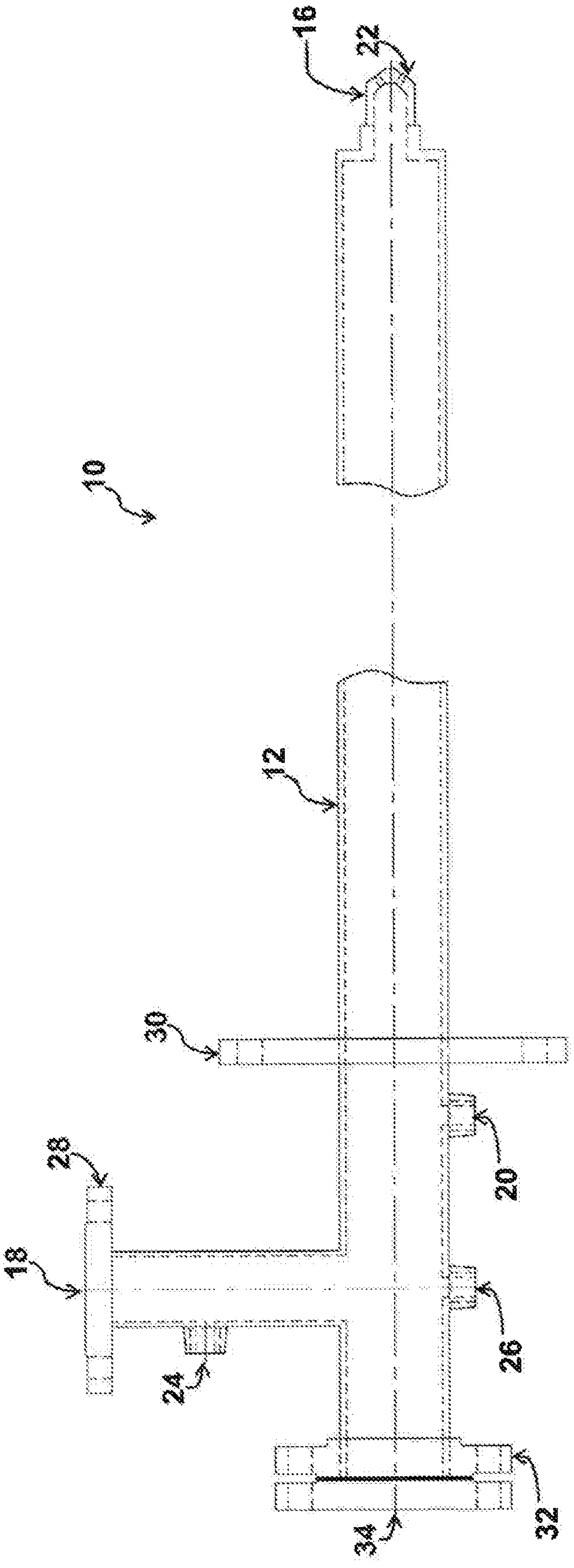
FIG. 1 is a side view, partly cutaway, of a spray gun assembly according to one embodiment of the invention.
Figure 2:
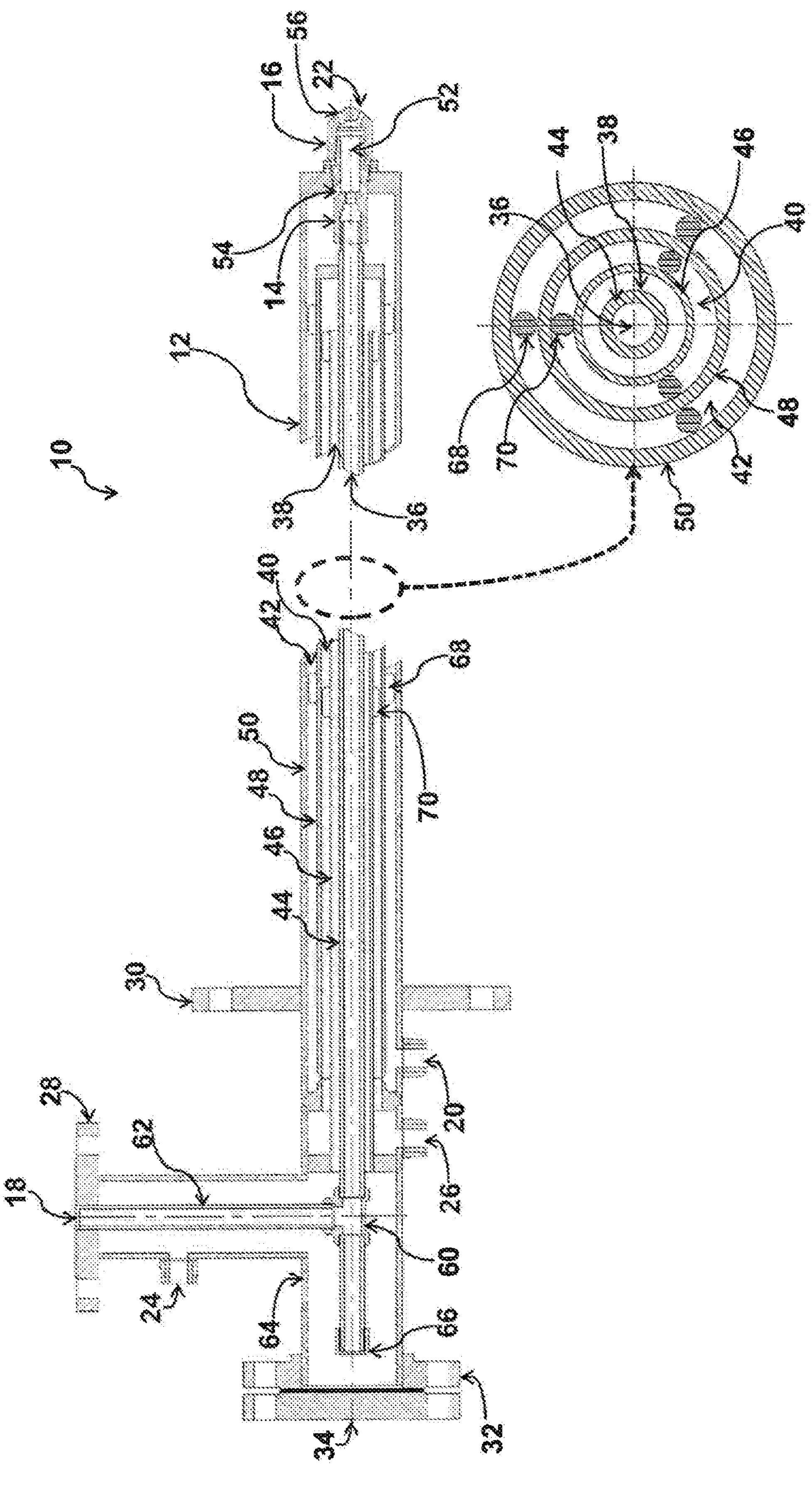
FIG. 2 is a longitudinal cross-sectional view and an axial cross-sectional view of the spray gun assembly of FIG. 1.
Figure 3:
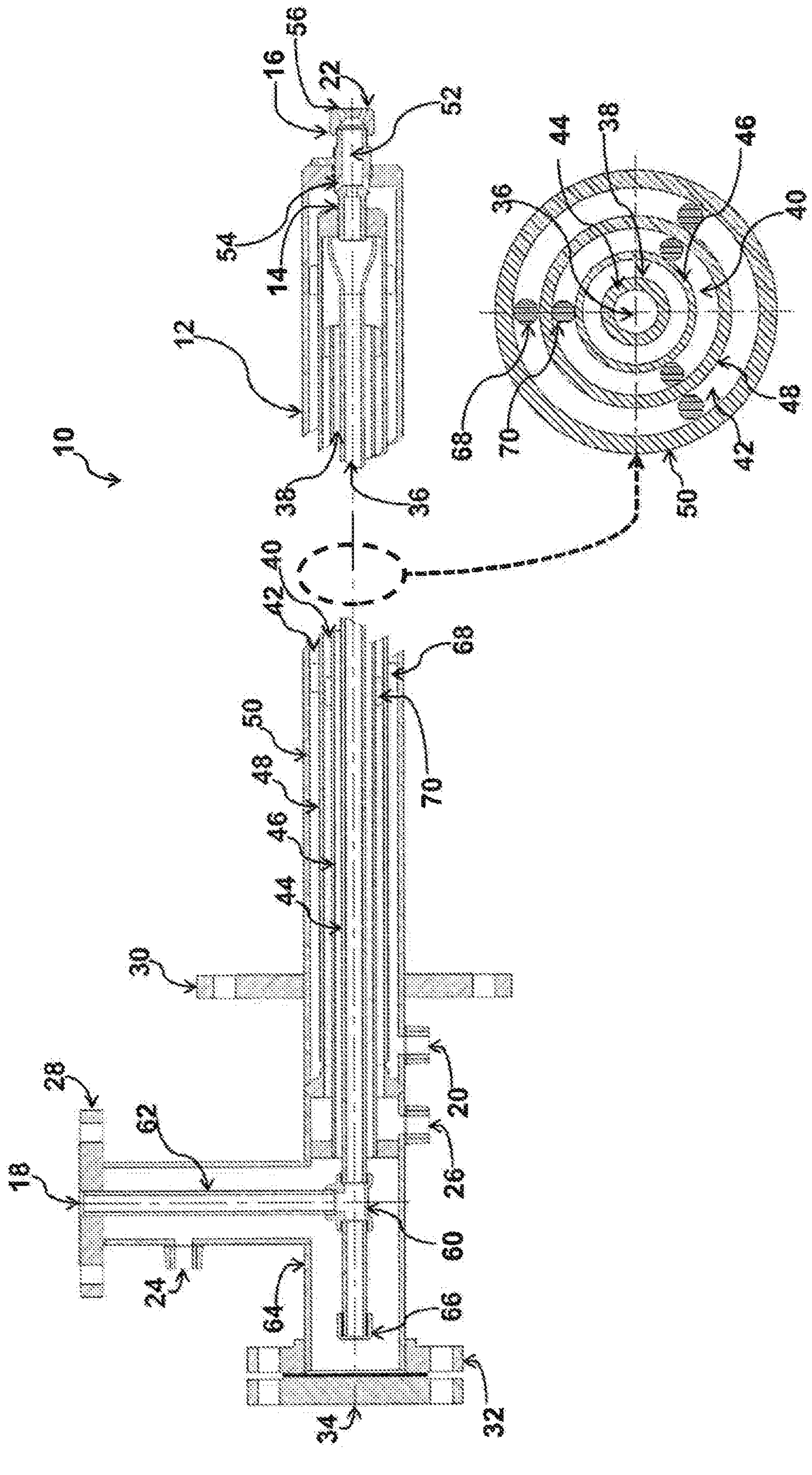
FIG. 3 is a longitudinal cross-sectional view and an axial cross-sectional view of a spray gun assembly according to another embodiment of the invention.
Figure 4:
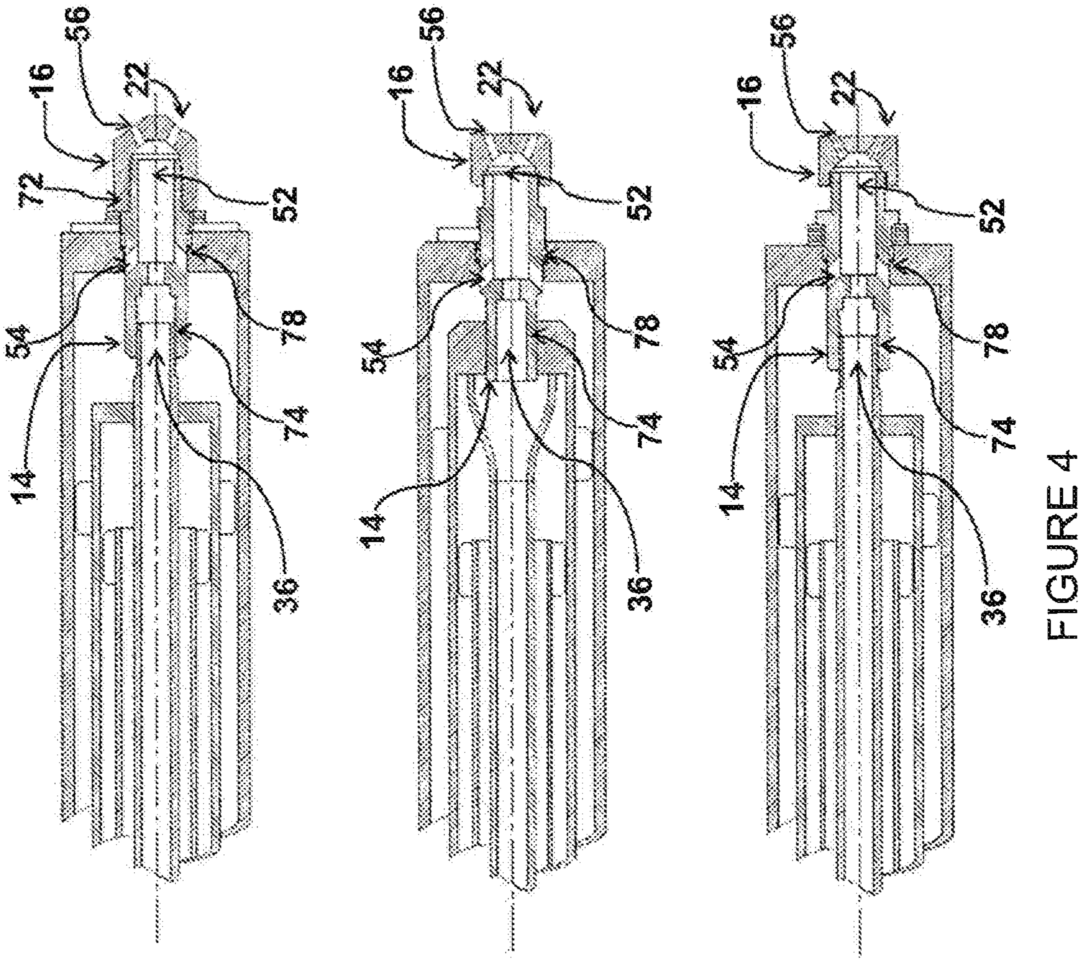
FIG. 4 is fragmentary longitudinal cross-sectional views of the spray gun assembly for three embodiments of the invention using different nozzle tips.

Referring to FIGS. 1 to 6, the atomizing spray gun assembly 10 comprises a lance 12 extending in the longitudinal direction with a nozzle body 14 at its downstream end (the right end in the view of FIGS. 1 to 3) and a nozzle tip 16 removably secured to the nozzle body 14.

The spray gun has three process stream inlets and two process stream outlets. These comprise an inlet 18 for a liquid that is to be atomized, an inlet 20 for a pressurized atomization fluid that breaks up the liquid into fine droplets, an outlet 22 for the atomized liquid and the atomization fluid at the nozzle tip 16, an inlet 24 for a heat transfer fluid, and an outlet 26 for the heat transfer fluid. A flanged connection 28 is provided at the liquid inlet 18 for connecting to the liquid supply. A mounting flange 30 on the lance 12 allows the spray gun to be mounted to a vessel for spraying inside the vessel. An inspection port 32 is provided at the upstream end (the left end in the view of FIGS. 1 to 3). The service port 32 is covered with a blind flange 34.

The spray gun 10 has a pressurized liquid supply passage 36, a heat transfer fluid supply passage 38, a heat transfer fluid return passage 40, and a pressurized atomization fluid supply passage 42. These passages are arranged in concentric pipes. The liquid supply passage 36 is the innermost, in center pipe 44. The heat transfer supply passage 38 is in pipe 46 which is concentric with and outside the center pipe 44. The heat transfer return passage 40 is in pipe 48 which is concentric with and outside pipe 46. The atomization fluid supply passage 42 is in the outermost pipe 50. The liquid supply passage 36 directs the liquid-to-be-atomized from its inlet 18, through the lance 12, to an internal mixing chamber 52 within the nozzle body 14. The atomization fluid passage 42 directs the flow of pressurized atomization fluid from its inlet 20, through the lance 12, to a plurality of annular passages 54 with a small flow area that direct the atomization fluid into the internal mixing chamber 52 at high velocity. The atomization fluid then impacts the liquid at high velocity in the internal mixing chamber 52, which causes the liquid to form a two-phase flow of liquid and air before being discharged out of the nozzle body 14 through a plurality of orifices 56 arranged in the nozzle tip 16. The pressure drop between the internal mixing chamber 52 and the environment (e.g., in a vessel such as a furnace) facilitates primary atomization of the liquid. Additional secondary atomization of the liquid occurs due to the high relative velocity of the liquid-air mixture with respect to a carrier gas in the environment into which the liquid is being sprayed that facilitates further atomization of the liquid.

The heat transfer fluid supply passage 38 directs the heat transfer fluid from its inlet 24, along the length of the lance 12, ending just upstream of the nozzle body 14. The heat transfer fluid then flows through the return passage 40, in the upstream direction of the lance 12, to its outlet 26. This flow path permits the heat transfer fluid to undergo heat transfer with the pipes 44, 50 that house the stream passages 36 and 42 respectively, as well as the fluids they contain. This assists in controlling the temperature-dependent physical properties of the fluids being sprayed as well as maintaining the temperature of the pipes in the lance 12 within an allowable range based on the mechanical properties of their materials of construction, which are typically stainless steel alloys or other materials tolerant to the process conditions.

The pipe 44 forming the liquid supply passage 36 is connected to a pipe tee fitting 60, which directs the flow of the liquid-to-be-atomized from its inlet 18 to the pipe 44 on the central longitudinal axis of the lance 12. An extension 64 of the pipe 44 protrudes from the other end of the pipe tee 60 toward the inspection port 32 at the upstream end of the lance 12. The pipe extension 64 is closed with a removable pipe cap 66. This permits inspection and servicing of the liquid passage 36.

Pipe spacers 68 are spaced along the length of the pipe 50 that defines the atomization fluid passage 42. These are arranged around the pipes 48, 50 to ensure that the flow area for the atomization fluid is symmetrical and equivalent around its circumference and to assist with the mechanical integrity of the assembly. Similarly, there are pipe spacers 70 equivalently spaced along the pipe 48 that defines the heat transfer fluid return passage 40. These also ensure that the pipes are equally spaced and are concentric along the length of the lance 12.

Figure 5:
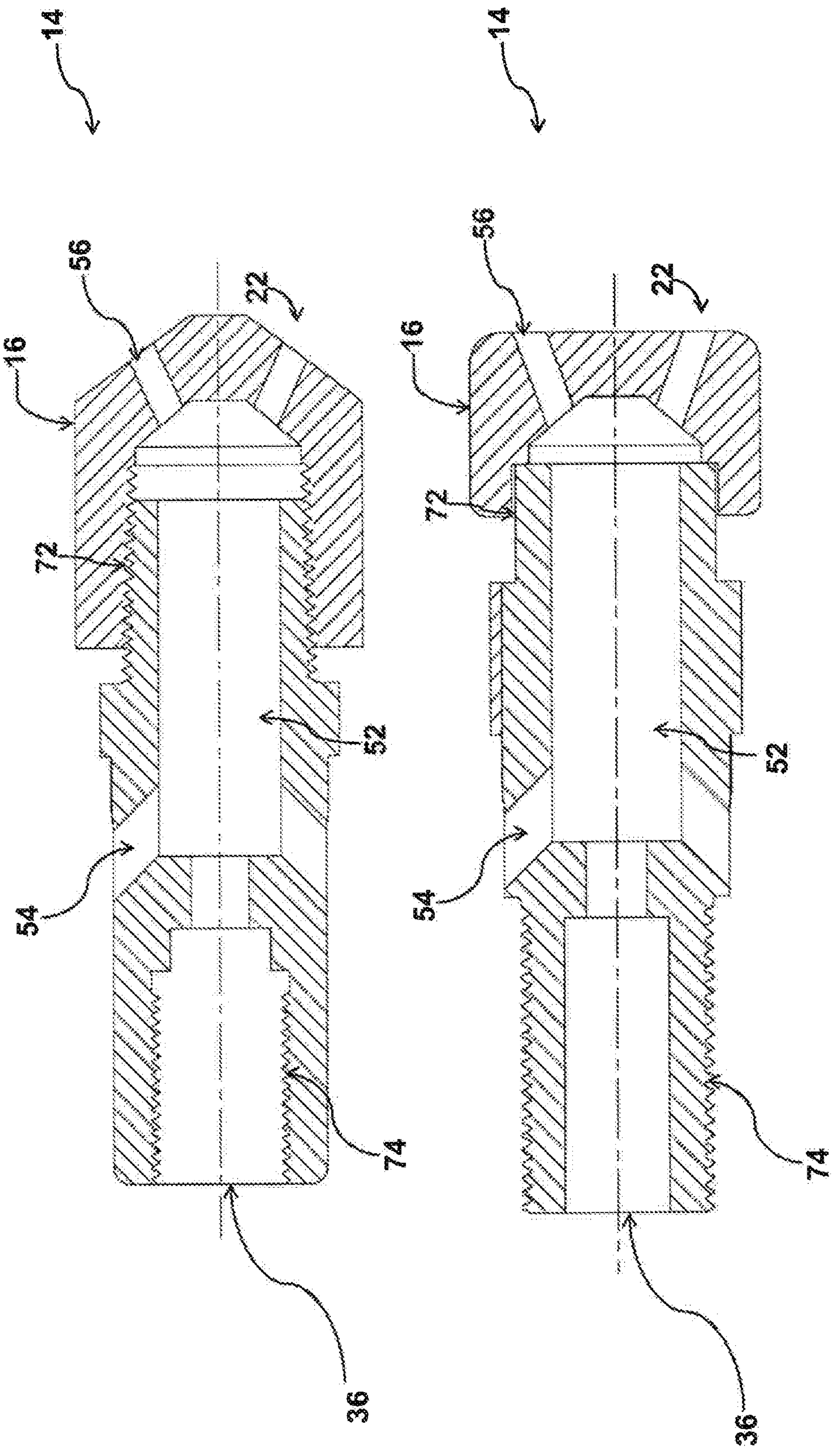
FIG. 5 is longitudinal cross-sectional views of the adjustable and removable nozzle body of the spray gun assemblies of FIGS. 2 and 3.

The nozzle tip 16 is connected to the nozzle body 14 by threading or welding 72 on the nozzle body 14, as best seen in FIG. 5. The nozzle tip 16 can thus be removed and replaced in the event of a problem with the existing tip or if a modified tip would yield a more optimal liquid spray. The nozzle body 14 is connected to the lance 12 by female or male threading 74 on the nozzle body 14. This connects to the pipe 44 that defines the liquid supply passage 36 to transfer the liquid from the lance 12 to the internal mixing chamber 52 within the nozzle body 14. The nozzle body 14 can thus be removed and replaced if there are any problems with it, or if other nozzle body designs would improve the operation of the spray gun.

Figure 6:
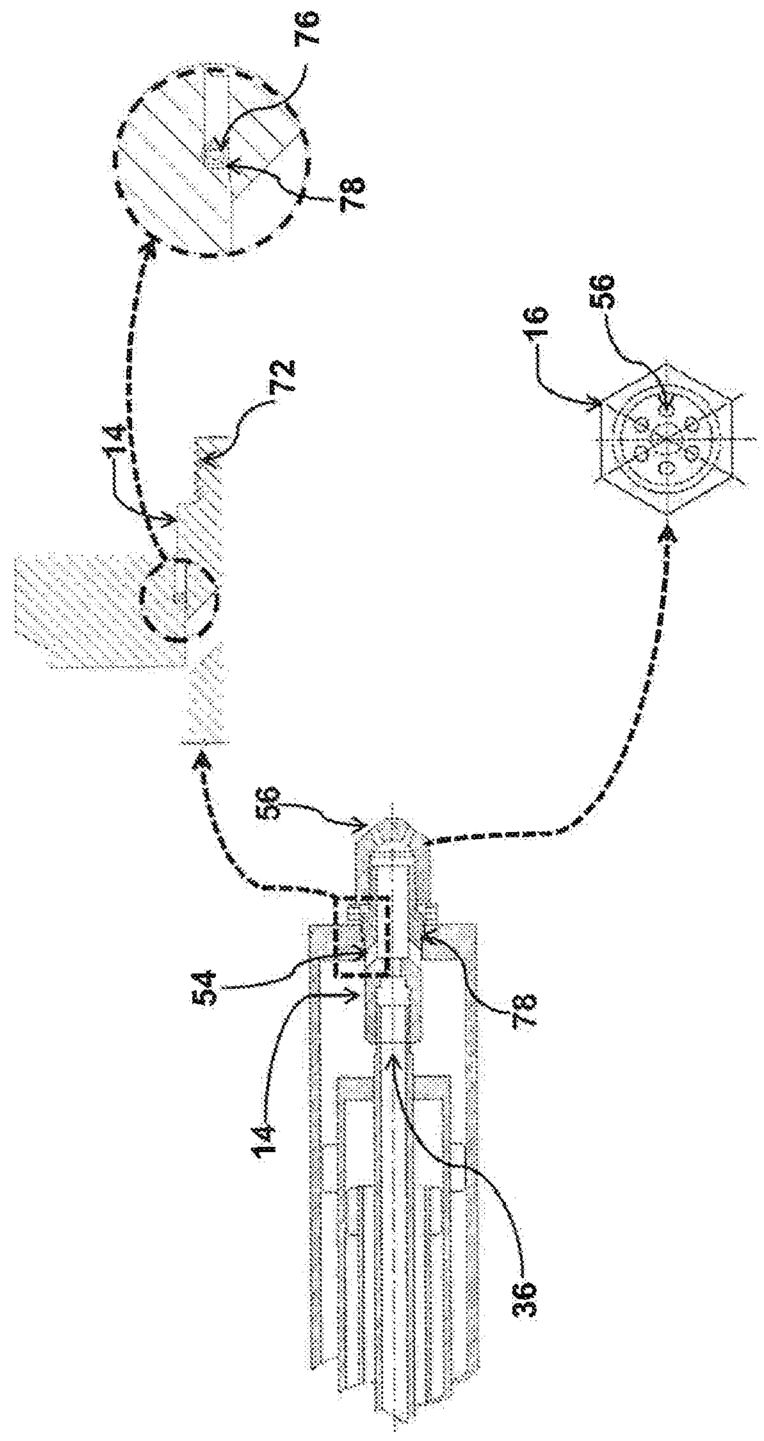
FIG. 6 is an enlarged fragmentary longitudinal cross-sectional view of the discharge end of the spray gun lance of FIG. 1 with details of the nozzle body and spray tip.
Figure 7:
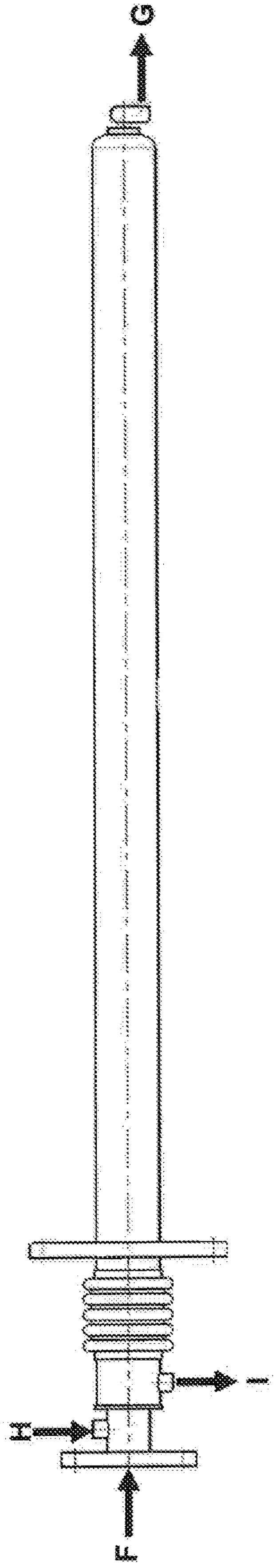
FIGURE 7 (Prior Art)
FIG. 7 is a side elevation view of a prior art spray gun.

In one embodiment of the invention, a metallic O-ring seal 76 is positioned in an O-ring groove 78 between the nozzle body 14 and the sealing face of the lance 12, as shown in FIG. 6. A seal is thus maintained when more or fewer threads 72 are engaged, as the nozzle body 14 is slid farther into or out of the lance 12. This causes more or less, respectively, of the flow area of the annular passages 54 to be exposed, for adjusting the flow of the atomization fluid from its passage 42 to the internal mixing chamber 52. Hence, the velocity and volumetric flow of the atomization fluid can be adjusted to achieve optimal atomization of the liquid. The metallic O-ring 76 is oriented so that the O-ring groove 78 is between the nozzle body 14 and the sealing face of the lance 12.

It will be understood that the mechanical design of the spray gun assembly 10 eliminates the need for expansion joints on the body of the gun or in the equipment internals, which are commonly required on prior art devices. This improves reliability and simplifies the fabrication of the unit.

The spray gun assembly 10 of the present invention is an improvement over prior designs in incorporating features that allow more control and optimization of the extent of atomization of the liquid being sprayed.

EXAMPLE

As one example of the implementation of the invention, the use of the spray gun assembly 10 as a sulfur gun for the generation of sulfur dioxide ($SO_2$) in a sulfur combustion furnace is now described.

Figure 8:
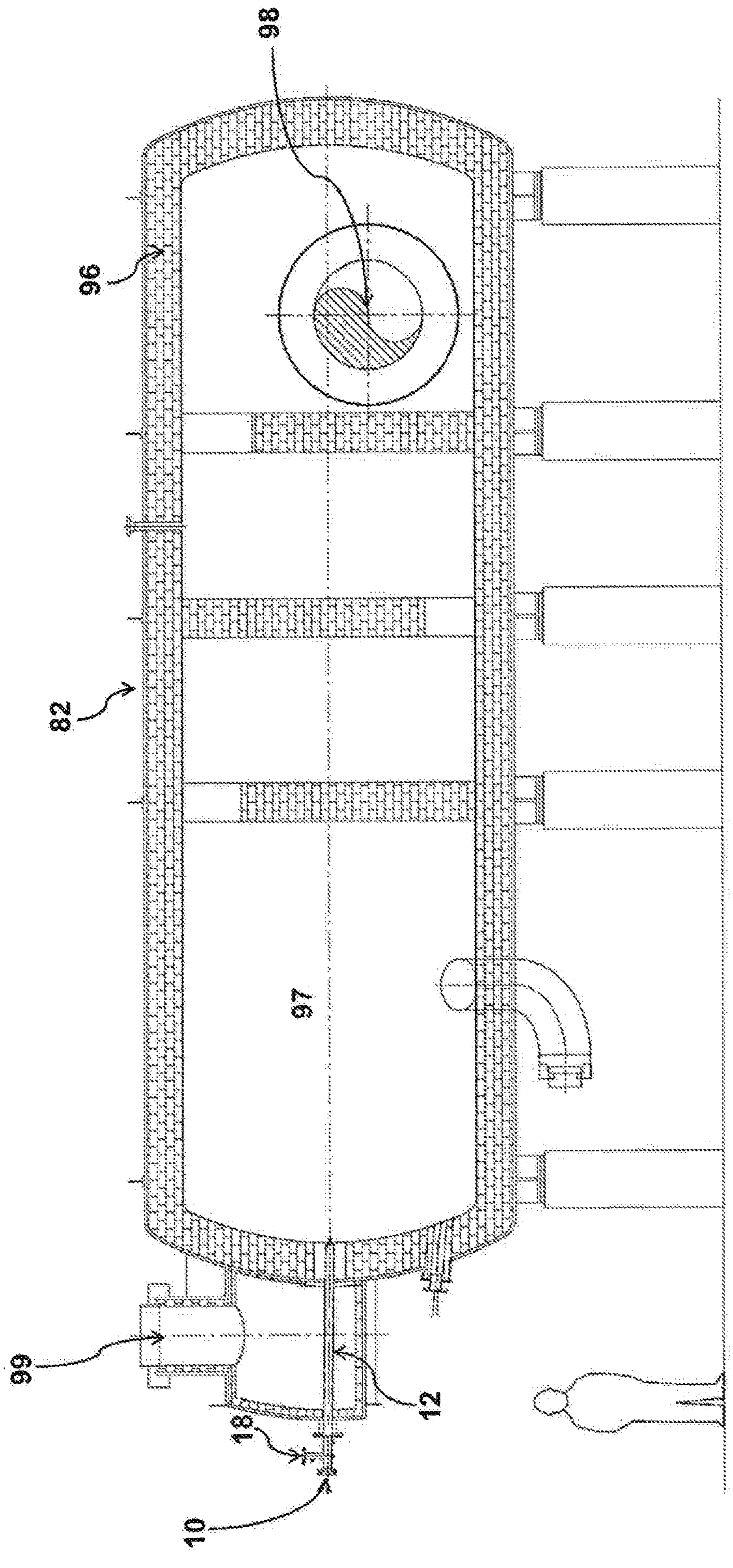
FIG. 8 is a schematic view of the spray gun assembly installed on a sulfur-burning furnace.

FIG. 8 depicts the spray gun mounted to a sulfur furnace to illustrate this application of the invention. The invention is well suited to this application due to its flexibility and ability to address issues observed in handling and atomizing hot liquid sulfur.

The sulfur-atomization gun 10 is mounted to a furnace 82 by the mounting flange 30 so that the lance 12 protrudes into the furnace 82. The gun is connected to a hot liquid sulfur supply line at inlet 18 with the flanged connection 28. A supply of pressurized air is connected to the gun at inlet 20, with the supply pressure of the air being greater than that of the sulfur. A steam supply line is connected to the gun at inlet 24 and a condensate return line is connected to the gun at outlet 26.

Molten sulfur(S) is fed to the inlet 18 at a temperature between about 130-145° C., preferably 140° C. At this temperature range, the viscosity of the sulfur is lowest. Increasing the temperature of the sulfur above 155° C. causes the viscosity to increase asymptotically, which leads to inadequate atomization and possible plugging. Low temperature leads to solidification of sulfur and plugging. The steam fed to the gun can be used to ensure the sulfur remains in the desired temperature-range for optimal flow conditions. The steam can also re-melt any sulfur that may cool and solidify in the gun during downtime.

Atomization air is fed to the inlet 20 of the spray gun and flows through the annular passages 54 having small cross-sectional areas so that the air impacts the molten sulfur at a high velocity in the internal mixing chamber 52. This causes the sulfur to become partially atomized before being discharged through the angled orifices 56 on the nozzle tip 16. The pressure drop between the inside of the gun and the inside of the furnace 82 causes the sulfur to further atomize as a mist of fine droplets. The high relative velocity between the drops and furnace carrier gas causes the sulfur to undergo secondary atomization, resulting in a mist of find droplets. The small size of the sulfur droplets helps to improve the combustion efficiency and inhibits the accumulation (or pooling) of unburned molten sulfur at the bottom of the furnace.

A stream of excess air 99 is also fed to the combustion furnace as a source of oxygen ($O_2$). The atomized liquid sulfur is then combusted with oxygen to produce sulfur dioxide ($SO_2$). The combustion reaction in a combustion chamber 97 is typically operated in the temperature range of 800-1500° C., with 800-1200° C. being the preferred temperature. The combustion furnace can be of a variety of materials, and the most preferred is a combination of a steel shell with high-temperature resistant brick-lining and castable materials 96. At such high temperatures, the metal of the sulfur gun has the potential to become warped or suffer other defects.

Therefore, the steam flowing through its passage 38 may be used as a means to cool the lance 12 to avoid deformation from the high temperatures in the furnace.

The resulting combustion gas has a high concentration of $SO_2$, typically in the range of 8-20% on a molar/volumetric basis, and exits the furnace via a gas outlet 98. This $SO_2$-rich gas can be used directly in various applications such as food preservation or as a reducing agent for bleaching or other purposes. More commonly, however, the $SO_2$-rich gas is fed to a sulfuric acid plant for the production of sulfuric acid ($H_2SO_4$) via the contact process. This process involves the catalytic conversion of $SO_2$ to $SO_3$ by reaction with $O_2$. Thus, in this application, operators must ensure the $O_2$:S ratio in the combustion furnace is sufficiently high for both the combustion and conversion reactions or add excess $O_2$ at some point downstream of the furnace and upstream of the converter. The conversion process is exothermic, so it is performed in stages (typically three to five) with interstage cooling to shift the reaction to favor product ($SO_3$) formation.

The $SO_3$-rich gas is fed to one or two absorption towers, where it is absorbed into an aqueous solution of sulfuric acid via reaction with water ($H_2O$). This creates the product $H_2SO_4$. In single absorption sulfuric acid plants, the gas passes through all stages of the converter before going to one absorption tower. In a double absorption plant, however, the gas will typically pass through three or four conversion stages, undergo absorption in an intermediate absorption tower, pass through the final conversion stage, and then undergo absorption again in a final absorption tower.

Sulfuric acid is used in great quantities and in many industries. The application of the present invention as a sulfur gun allows the first step in the production process of this valuable chemical to be performed efficiently and be optimized based on the feed conditions of the process fluids.

Specific examples of systems, methods, and apparatus have been described herein for purposes of illustration. The technology provided herein can be applied to systems other than the example systems described above. Many alterations, modifications, additions, omissions, and permutations are possible within the practice of this invention. This invention includes variations on described embodiments that would be apparent to the person skilled in the art, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Throughout the foregoing description and the drawings, specific details have been set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense. The scope of the invention is to be construed in accordance with the following claims.

The invention claimed is:

1. A spray gun assembly, comprising:

a lance having:

(i) an inlet for a liquid to be atomized;

(ii) an inlet for an atomizing gas;

(iii) an inlet for a heat-transfer fluid;

(iv) an outlet for the heat-transfer fluid;

a nozzle body removably attached to the lance, the nozzle body having an internal mixing chamber for receiving the liquid to be atomized and the atomizing gas, the nozzle body having a plurality of flow passages arranged for a flow of the atomizing gas from the lance into the internal mixing chamber;

a spray nozzle tip removably affixed to a discharge end of the nozzle body, the spray nozzle tip having discharge orifices;

the lance further comprising:

(v) a liquid supply passage extending between the inlet for the liquid to be atomized and the nozzle body;

(vi) an atomizing gas passage extending between the inlet for the atomizing gas and the flow passages in the nozzle body; and (vii) a heat-transfer fluid passage extending from the inlet for the heat-transfer fluid, through the lance concentric with the liquid supply passage and the atomizing gas passage, and to the outlet for the heat-transfer fluid;

wherein the nozzle body is movable on the lance such that a flow area of the flow passages in the nozzle body is adjustable between a relatively larger flow area and a relatively smaller flow area.

2. A spray gun assembly according to claim 1, wherein the nozzle body is connected to the lance by a threaded connection configured such that movement of the nozzle body relatively farther into the lance on the threaded connection exposes the relatively larger flow area of the flow passages in the nozzle body, and movement of the nozzle body relatively farther out of the lance on the threaded connection exposes the relatively smaller flow area of the flow passages in the nozzle body.

3. A spray gun assembly according to claim 2, wherein a metallic O-ring positioned in an O-ring groove in the lance forms a seal between the nozzle body and the lance.

4. A spray gun assembly according to claim 1, further comprising a first pipe for the liquid supply passage;

a second pipe and a third pipe for the heat-transfer fluid passage, wherein the second pipe is concentric with and outside the first pipe and the third pipe is concentric with and outside the second pipe; and a fourth pipe for the atomizing gas passage, wherein the fourth pipe is concentric with and outside the third pipe.

5. A spray gun assembly according to claim 4, wherein the nozzle body is removably connected to the first pipe by a threaded connection.

6. A spray gun assembly according to claim 4, wherein the inlet for the liquid to be atomized connects to the first pipe via a tee connection, and a section of the first pipe extends from the tee connection toward an upstream end of the lance and is closed with a removable pipe cap.

7. A spray gun assembly according to claim 6, further comprising an inspection port at the upstream end of the lance, the inspection port having a removable blind and providing an operator access to the first pipe and the removable pipe cap.

8. A spray gun assembly according to claim 4, further comprising pipe spacers between the third pipe and the fourth pipe.

9. A spray gun assembly according to claim 8, in which three or more of the pipe spacers are spaced equally apart around the third pipe.

10. A spray gun assembly according to claim 4, further comprising pipe spacers between the second pipe and the third pipe.

11. A spray gun assembly according to claim 10, in which three or more of the pipe spacers are spaced equally apart around the second pipe.

12. A spray gun assembly according to claim 1, wherein the flow passages in the nozzle body are arranged symmetrically in an annular array about the nozzle body.

13. A spray gun assembly according to claim 1, wherein the spray nozzle tip is removably attached to the discharge end of the nozzle body by a threaded connection.

14. A spray gun assembly according to claim 1, wherein the spray nozzle tip has a plurality of the discharge orifices arranged to discharge atomized liquid droplets.

15. A spray gun assembly according to claim 1, further comprising a mounting flange affixed to the lance and extending around the lance, configured for mounting the spray gun assembly on a vessel, with the spray nozzle tip and part of the lance extending into the vessel.

16. A spray gun assembly according to claim 1, further comprising a flange at the inlet for the liquid to be atomized, configured to connect the spray gun assembly to a supply of the liquid to be atomized.

17. A spray gun assembly according to claim 1, that does not use any expansion joints.

18. A method of spraying an atomized liquid using the spray gun assembly of claim 1, comprising:

(a) feeding the liquid to be atomized into the inlet for the liquid to be atomized;

(b) feeding the atomizing gas into the inlet for the atomizing gas;

(c) feeding the heat-transfer fluid into the inlet for the heat-transfer fluid;

(d) producing atomized liquid in the internal mixing chamber of the nozzle body;

(e) spraying the atomized liquid out of the internal mixing chamber through the spray nozzle tip.

19. A method according to claim 18, wherein the liquid to be atomized comprises molten sulfur.

20. A method according to claim 19 wherein the molten sulfur is at a temperature in the range of 130-155° C.

21. A method according to claim 19, wherein the molten sulfur is at a temperature of approximately 140° C.

22. A method according to claim 18, wherein the liquid to be atomized comprises a liquid hydrocarbon fuel.

23. A method according to claim 18, wherein the atomizing gas comprises pressurized air.

24. A method according to claim 18, wherein the atomizing gas comprises oxygen or oxygen-enriched air.

25. A method according to claim 18, wherein the heat-transfer fluid comprises steam.

26. A method according to claim 18, wherein the atomizing gas is supplied at a pressure that is at least 3 bar greater than a supply pressure of the liquid to be atomized.

* * * * *